United States Patent [19]

Keith

[11] 4,012,850

[45] Mar. 22, 1977

[54] RADIOGRAPHIC CAMERA SIMULATOR

[75] Inventor: James A. Keith, Concord, Mass.

[73] Assignee: Raytheon Company, Lexington, Mass.

[22] Filed: July 14, 1975

[21] Appl. No.: 595,950

[52] U.S. Cl. .................................... 35/10; 35/13; 35/17; 35/19 R

[51] Int. Cl.² ...................................... G09B 25/00

[58] Field of Search ............ 35/1, 10, 13, 17, 19 R, 35/19 B, 25; 128/2 A; 235/184; 273/138 A

[56] References Cited

UNITED STATES PATENTS

| 2,998,193 | 8/1961 | Skramstad et al. | 35/25 X |
|---|---|---|---|
| 3,226,847 | 1/1966 | Falk et al. | 35/19 R |
| 3,363,329 | 1/1968 | Filipov | 35/1 |
| 3,390,268 | 6/1968 | Witte et al. | 235/184 X |
| 3,643,166 | 2/1972 | McCurnin et al. | 35/1 X |

Primary Examiner—Anton O. Oechsle
Assistant Examiner—Vance Y. Hum
Attorney, Agent, or Firm—David M. Warren; Joseph D. Pannone; Milton D. Bartlett

[57] ABSTRACT

A simulator of a radiographic camera providing signals representing the magnitude of radiant energy incident upon the camera and the location of the radiant energy relative to the camera. The simulator is composed of electrical circuits which simulate the repetition frequency as a function of the amplitude of radioactive events and provide a series of amplitude modulated pulses having a distribution of amplitudes according to the frequency of occurrence of the amplitudes. A circuit providing randomly occurring values of location coordinates produces X and Y location signals.

8 Claims, 8 Drawing Figures

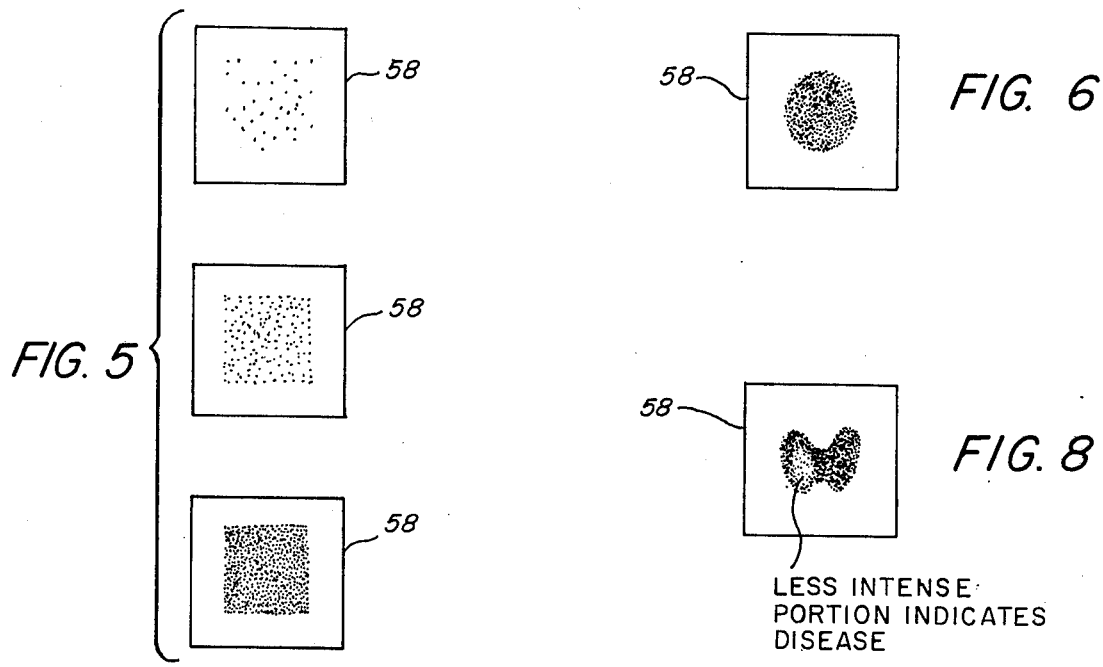
FIG. 5
FIG. 6
FIG. 8
LESS INTENSE PORTION INDICATES DISEASE
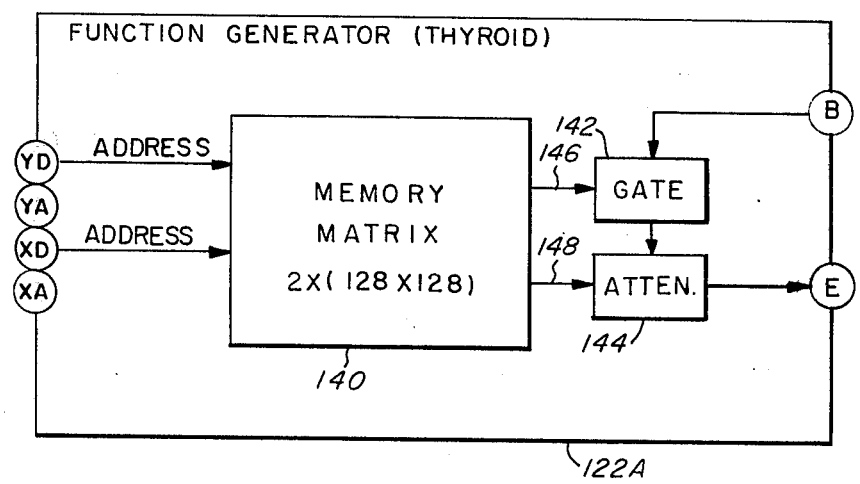
FIG. 7

RADIOGRAPHIC CAMERA SIMULATOR

BACKGROUND OF THE INVENTION

Radiographic cameras responsive to X-ray and gamma ray radiation, such as the Anger camera disclosed in U.S. Pat. No. 3,011,057, are frequently demonstrated at exhibitions for nuclear medicine, hospital and industrial X-ray equipment wherein such cameras are shown mounted in a fixed position for taking nuclear photographs or are mounted on a scanning apparatus which imparts a relative motion between the camera and a subject to provide a radiographic image of a larger area of the subject. When demonstrations of such cameras are conducted in a hospital licensed to utilize radioactive materials, a radioactive phantom subject or a live human patient having ingested radio isotopes is utilized in demonstrating the camera and its associated display equipment.

However, a problem arises in that most exhibitions are held in the exhibition halls of hotels and other public buildings which are not licensed by the Federal Government for the handling of radioactive materials. Accordingly, at such exhibitions visitors may not see actual demonstrations of the cameras and their associated display and signal processing equipment.

SUMMARY OF THE INVENTION

The aforementioned camera display and signal processing equipment can be demonstrated and other advantages are provided by a simulator of a radiographic camera which, in accordance with the invention, incorporates electrical circuitry which provides X and Y coordinate voltage signals such as those of the Anger camera to designate the location of a radioactive event relative to the camera which is being simulated. A camera output signal representing the energy of a radioactive event is simulated by circuitry which synthesizes the probability distribution of the occurrence of events and the amplitudes of these events to provide a series of amplitude modulated pulse signals having the desired distribution of amplitudes according to the frequency of occurrence of such amplitudes.

In a preferred embodiment of the invention, the frequency distribution of events is provided by modulating the repetition frequency of a train of pulses of a pulse generator with a modulation pattern in the form of a rectified sinusoid. The amplitudes of the pulses of the pulse generator are modulated with a modulation pattern in the form of a repeating ramp to simulate the distribution of amplitudes according to the frequency of their occurrence. Each of the pulses is utilized for triggering a pair of random number generators to provide the X and Y coordinate amplitudes. Circuitry is also disclosed for delineating an area of predetermined shape to provide a simulated image of a prescribed subject form, such as a square, circle, or thyroid gland.

BRIEF DESCRIPTION OF THE DRAWINGS

The aforementioned aspects and other features of the invention are explained in the following description taken in connection with the accompanying drawings wherein:

FIG. 5 shows three views of the face of an oscilloscope of a display system of FIG. 1, the three views showing the sequential buildup of image points on the face of the oscilloscope at different instances of time;

FIG. 6 shows a simulated image having a circular perimeter;

FIG. 7 is a block diagram of an alternative form of the function generator of FIG. 4, the function generator of FIG. 7 incorporating a memory for delineating the perimeter and intensity variations of a preselected subject such as a thyroid gland; and FIG. 8 shows a simulated image of a thyroid gland in which a diseased portion is less intense.

DESCRIPTION OF THE PREFERRED EMBODIMENT

Figure 1:
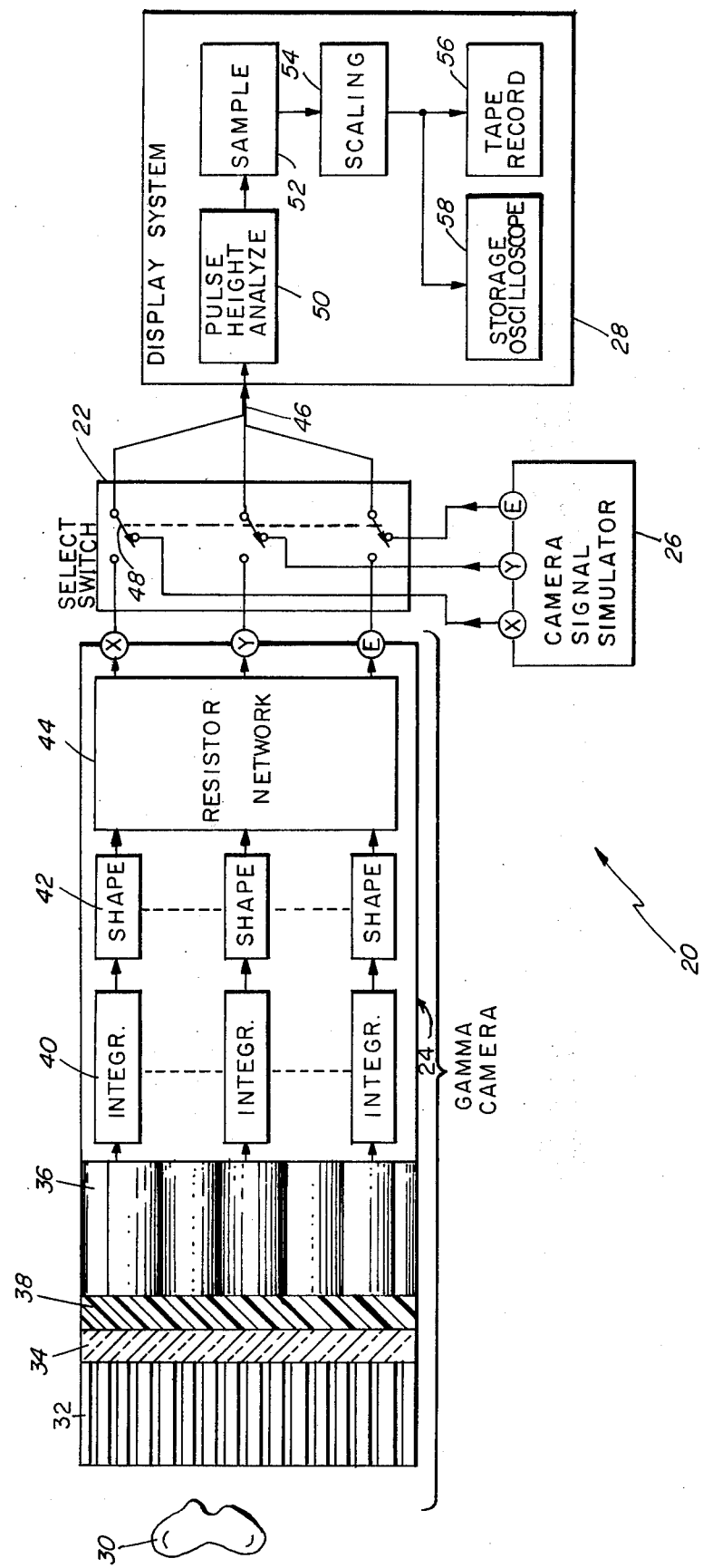
FIG. 1 is a block diagram of a radiographic camera system showing the point of interconnection of the camera signal simulator of the invention.

Referring now to FIG. 1 there is seen a block diagram of a radiographic imaging system 20 including a switch 22 for selectively coupling a gamma camera 24 or a camera signal simulator 26 embodying the present invention to a display system 28. A radioactive subject 30, such as a radioactive thyroid, is shown positioned in front of the camera 24 for forming an image of the subject 30 by the camera 24 and the display system 28. For purposes of demonstrating the display system 28 in a situation wherein the target 30 is absent, the switch 22 is operated to decouple the camera 24 from the display system 28 and to couple the simulator 26 to the display system 28. In accordance with the invention, the simulator 26 provides signals at its X and Y terminals which are of substantially the same form as the signals provided by the camera 24 at its X and Y terminals in response to the presence of the subject 30 for locating the positions of radioactive events. The simulator 26 at its E terminal provides signals substantially the same as those provided by the camera 24 at its E terminal in response to radioactive events within the subject 30, the signals at terminal E representing the magnitude of the energy content of radiation received at the camera 24 in response to the radioactive events.

The camera 24 incorporates structure such as that found in the Anger camera, and is seen to comprise a collimator 32, a scintillator crystal 34 of a material such as sodium iodide which emits light in response to radiant energy from the subject 30, a set of photomultipliers 36 which face the scintillator crystal 34 and are separated therefrom by a light pipe 38 of a material such as Lucite, and electrical circuitry interconnecting the X, Y and E terminals to the photomultipliers 36, the circuitry including integrators 40 for forming a single electrical pulse from a photomultiplier 36 in response to flashes of light emanating from the scintillator crystal 34 in response to a single radioactive event, pulse shapers 42 coupled to each of the integrators 40 and a resistor network 44 for combining the signals of the photomultipliers 36 to produce the signals at the X, Y and E terminals. Such a camera has been described in a patent application for a gamma camera by Karl J. Stout having Ser. No. 418,157 filed Nov. 21, 1973, now Pat. No. 3,914,611. The terminals X, Y and E are coupled via the switch 22 and cable 46 to the display system 28 when the arms 48 are in the upper position, the simulator 26 being coupled to the cable 46 when the arms 48 are in the lower position.

The display system 28 comprises a pulse height analyzer 50, a sampler 52, a scaler 54, a tape recorder 56 and a storage-type oscilloscope 58. The pulse height analyzer 50 passes pulses having amplitudes greater than a minimum threshold value and smaller than a maximum threshold value. The sampler 52 samples the pulse signals from the analyzer 50 for presentation of these samples on the tape recorder 56 and the oscilloscope 58. As disclosed in the aforementioned patent application of Stout, the samplers 52 are operated in response to a signal from the pulseheight analyzer 50 to provide samples of the X and Y signals which are of sufficient duration to permit the scaler 54 to multiply the X and Y signals by the inverse of the magnitude of the E signal. This normalizes the values of the X and Y signals to provide to the oscilloscope 58 and the tape recorder 56 the true location of the point of impact of a gamma ray photon upon the scintillator crystal 34. The storage screen of the oscilloscope 58 permits an operator of the system 20 to observe a buildup of the image of the subject 30 or of the simulated subject of the simulator 26 point by point, the storage persistence being of a suffcient duration to permit observation of the entire image.

Figure 2:
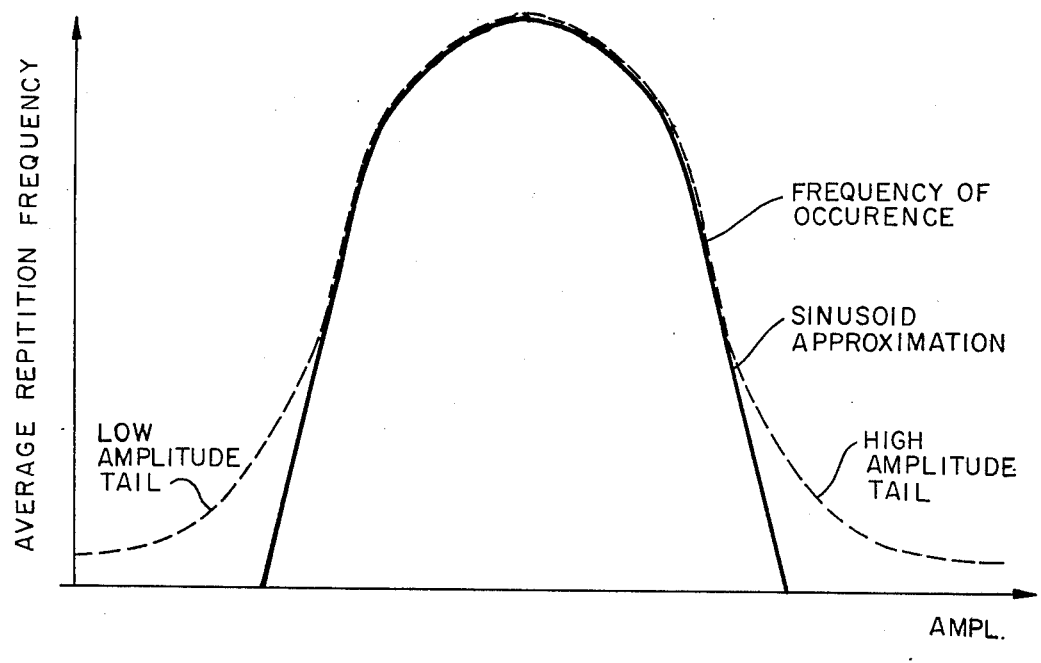
FIG. 2 is a graph of the relative frequency of occurrence of radioactive events of differing amplitudes or energies.

Referring now to FIG. 2, there is seen a dashed curve representing the frequency of occurrence of radioactive events having the values of amplitude designated by the horizontal axis. The solid curve represents an approximation by a sinusoid. It is seen that the sinusoidal approximation is valid except for the low and high amplitude tails of the dashed curve. It is noted that the events represented by the low amplitude tail are substantially attenuated by the camera 24 due to internal reflections within the scintillator crystal 34 as well as the viewing angle of each photomultiplier 36 so that much of the energy of the low amplitude events is not seen at terminal E of the camera 24. Thus, the sinusoidal approximation is valid also at the low amplitude end of the graph.

The high amplitude tail of the graph is of relatively small amplitude as compared to the major portion of the radioactive events. That is, the average repetition frequency of the high amplitude radioactive events is sufficiently small so that it may be neglected. For this reason the sinusoidal approximation is valid at the high amplitude tail portion of the graph.

Figure 3:
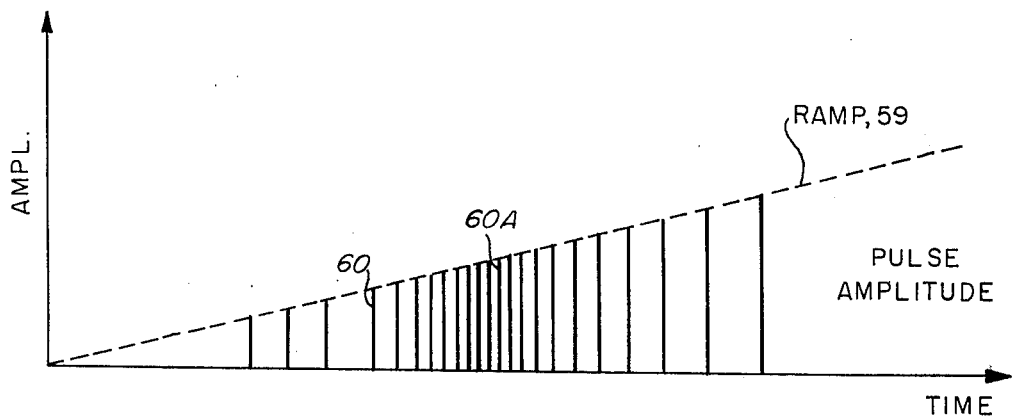
FIG. 3 is a graph of the amplitude of the energy pulse at the output of a radiographic camera in response to events occurring at various instances of time, the frequency of occurrence of the various events being in accordance with the graph of FIG. 2.

Referring now to FIG. 3, there is displayed a dashed line representing a ramp 59 to indicate the buildup of the signal at the E terminal with time, the lines 60 representing the magnitudes of signals at terminal E, the lines 60 being spaced apart with a varying spacing in accordance with the frequency of occurrence of E pulse signals at terminal E being shown in the graph of FIG. 2. The lines 60 are drawn for the situation of long-term statistical averaging. In particular, it is noted that while the graph of FIG. 2 shows that most of the E pulses have a value similar to the value of the line 60 which is further identified by the legend A, the line 60A being at the midpoint of the graph of FIG. 3, the varying spacing of the lines 60 with a frequency distribution in accordance with that of FIG. 2 permits the use of the ramp 59 to represent the amplitudes of the signals.

Figure 4:
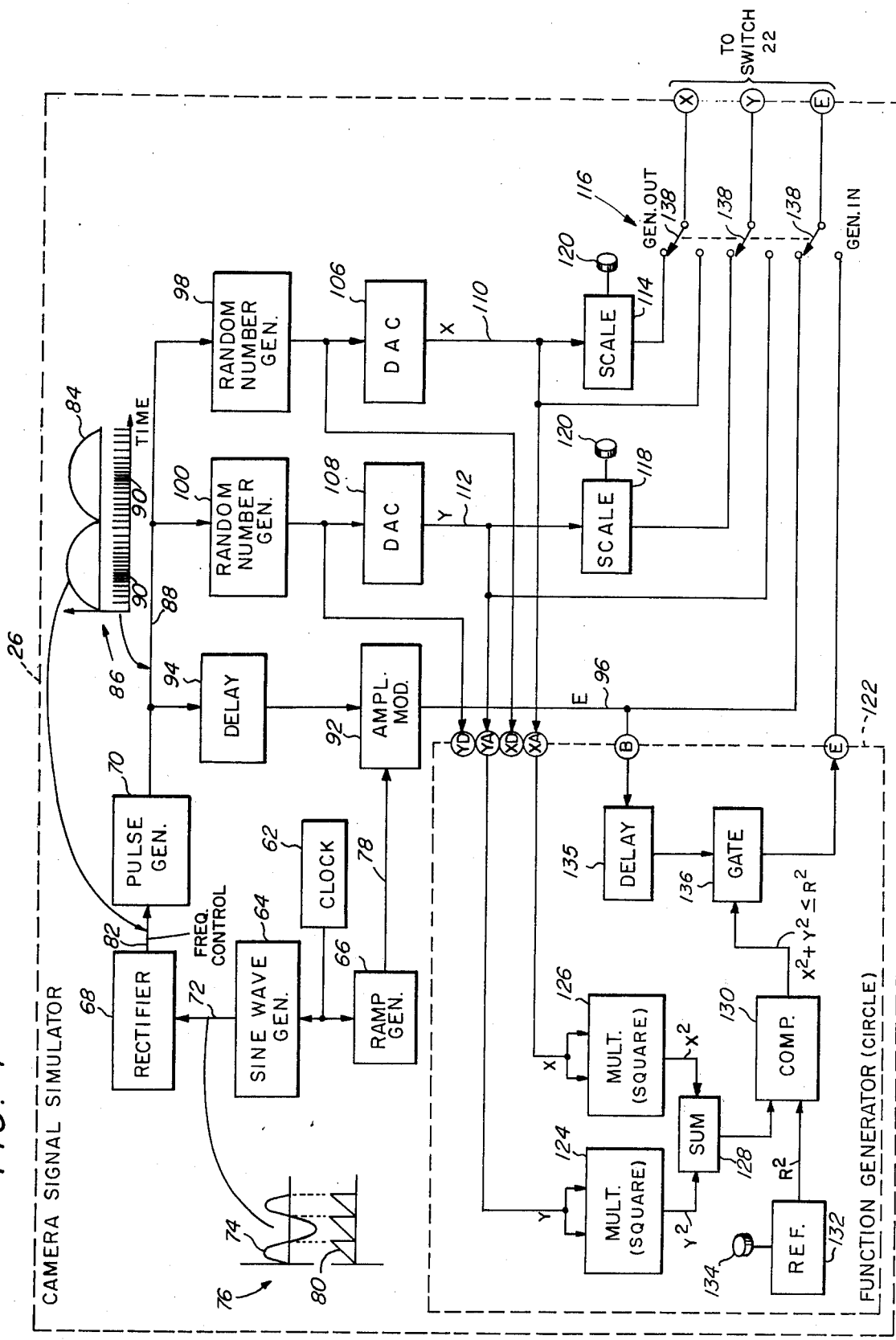
FIG. 4 is a block diagram of the camera signal simulator of the invention, the block diagram also showing a function generator for producing an image with a circular perimeter and a switch for selecting a rectangular perimeter or circular perimeter for the simulated image.

Referring now to FIG. 4, there is seen a block diagram of the simulator 26 of FIG. 1. The simulator comprises the clock 62, a sine-wave generator 64, a ramp generator 66, a full-wave rectifier 68 and a pulse generator 70. The sine-wave generator 64 and the ramp generator 66 are driven in synchronism by pulses from the clock 62, the output of the sine-wave generator 64 on line 72 being shown by trace 74 of graph 76 while the output of the ramp generator 66 on line 78 is shown on the lower trace 80 of the graph 76. The sine wave on line 72 is rectified by the full-wave rectifier 68, the output of the rectifier 68 on line 82 being shown by trace 84 of graph 86. The pulse generator 70 produces a train of pulses on line 88, the train of pulses on line 88 being seen by the pulses 90 depicted in the lower portion of the graph 86. The magnitude of the signal on line 82 at the input to the pulse generator 70 serves as a frequency control of the repetition frequency of the pulses 90, and varies the repetition frequency of the pulses 90 with a modulation pattern in the form of the rectified sine wave of the trace 84.

As was mentioned hereinbefore, the simulator 26 provides a repetition frequency distribution of pulse signals which, in accordance with the invention, closely approximates the distribution of the repetition frequency of pulses provided by the gamma camera 24 of FIG. 1 in response to radioactive events of the subject 30. In accordance with the teachings of the graph of FIG. 2, the sine-wave generator 64 and the rectifier 68 provide a repetition of rectified sinusoids having the frequency distribution of the solid graph of FIG. 2. By utilizing the output of the rectifier 68 to modulate the repetition frequency of the pulses produced by the pulse generator 70, the sequence of these pulses 90 as shown in graph 86 has the same repetition frequency format as does the series of pulses 60 of FIG. 3. The sequence of pulses 60 of FIG. 3 differs from the pulses 90 of graph 86 of FIG. 4 in that the pulses 60 are of varying amplitude.

The simulator 26 further comprises an amplitude modulator 92 and a delay unit 94 which are utilized in modulating the amplitudes of the pulses appearing on line 88 from the pulse generator 70. The pulse signals on line 88 are passed through the delay unit 94 and into the modulator 92 wherein they are modulated by the ramp signal of line 78 to produce on line 96 a sequence of pulses which occurs repetitively, the sequence of pulses having the amplitude modulation and repetition-frequency modulation depicted in FIG. 3. The line 96 is further identified by the legend E because the signal on line 96 is a simulation of the signal appearing at terminal E of the camera 24 of FIG. 1.

The simulator 26 further comprises random number generators 98 and 100, and digital-to-analog converters hereinafter referred to as DAC 106 and DAC 108 which are utilized in providing the X and Y signals on lines 110 and 112. The random number generators 98 and 100 are triggered by the occurrence of each pulse on line 88 and, in response thereto, each provides a digital number respectively to the DAC's 106 and 108. The delay unit 94 delays the pulses on line 88 by an amount of time equal to the amount of time required for the random number generators 98 and 100 to produce their digital output numbers. Thus, the pulse signals at the output of the delay unit 94 arrive at line 96 at the same time as the corresponding random numbers are coupled from the generators 98 and 100 to the DAC's 106 and 108. The DAC's 106 and 108 convert the digital numbers respectively of the generators 98 and 100 to the analog voltages respectively of the X signal on line 110 and the Y signal on line 112. The X signal is coupled via a scaler 114 and a switch 116 to appear at the X terminal of the simulator 26. The Y signal is coupled via a scaler 118 and the switch 116 to appear at the Y terminal of the simulator 26. Also, the E signal on line 96 is coupled by the switch 116 to appear at the E terminal of the simulator 26. Each of these scalers 114 and 118 may comprise potentiometers and are provided with knobs 120 whereby an operator of the simulator 126 can vary the magnitude of the signals appearing at the X and Y terminals.

The simulator 26 also comprises a function generator 122 which provides a circular outline to the synthetic image provided by the simulator 26. The function generator comprises two multipliers 124 and 126, a summer 128, a comparator 130, a source 132 of reference voltage having a knob 134 for adjusting the reference voltage, a delay unit 135 and a gate 136. The function generator 122 is provided with six terminals, namely, terminal YD which is coupled to the output of AND gate 104 providing the digital representation of the Y signal, terminal YA which is coupled to line 112 providing the analog representation of the Y signal, terminal XD which is coupled to the output of the AND gate 102 providing the digital representation of the X signal, terminal XA which is coupled to line 110 providing the analog representation of the X signal, terminal B coupled to the E signal on line 96 and terminal E coupled to the output of the gate 136. The signal from terminal YA is applied to two input terminals of the multiplier 124 which then forms the square of Y. The signal from terminal XA is applied to two input terminals of the multiplier 126 to form the square of X. The squared values of X and Y are then summed together by the summer 128, the sum being applied to the comparator 130 to be compared against the reference voltage of the source 132. As seen in the figure, the reference voltage of the source 132 represents the square of R, the square of the radius of the circular perimeter of the simulated image. The comparator 130 activates the gate 136 to pass a signal from terminal B via the delay unit 135 to terminal E for all values of X and Y satisfying the relationship that the sum of the squares of X and Y is less than or equal to the square of the radius, R. The delay unit 135 delays the signal at terminal B by an amount of time equal to the time required by the function generator 122 to provide the output of the comparator 130 so that the gate 136 is operated in time to pass the signal from terminal B.

When the switch 116 has its arms 138 in the upper position, all values of the signal X from zero to the maximum number provided by the generator 98 are coupled to the X terminal and, similarly, all values of the signal Y from zero to the maximum number provided by the generator 100 are coupled to the terminal Y. Accoringly, assuming that the scalers 114 and 118 are set to the same scaling factor, for example, a value of one-half, the simulated image has a square perimeter. In the event that the scalers 114 and 118 are set to different scale factors, then the simulated image has a rectangular form.

When the switch 116 has its arms 138 in the lower position, the X and Y signals bypass the scalers 114 and 118. However, no signal appears at terminal E unless the aforementioned relationship at the output of the comparator 130 is satisfied. Therefore, all values of X do not appear for any one value of Y, but only such values of X as fall within a circle of radius R appear in the simulated image and, a corresponding restriction is placed on the value of the Y signals.

Referring now to FIG. 5, there are seen three views of the face of the oscilloscope 58 of FIG. 1, the oscilloscope 58 portraying a simulated image having a rectangular perimeter. In the first view there are relatively few image points present on the face of the oscilloscope 58. More points are present in the second view and in the third view is seen the completed simulated image. This image is obtained when the switch 116 of FIG. 4 has its arms 138 in the upper position.

Referring now to FIG. 6, there is shown a view of the oscilloscope 58 which portrays a simulated image having a circular perimeter. This image is obtained when the switch 116 of FIG. 4 has its arms 138 in the lower position.

Referring now to FIG. 7, there is shown an alternative embodiment of the function generator 122 of FIG. 4, this alternative embodiment being identified by the legend 122A. The function generator 122A has the same terminals as the function generator 122, namely, terminals YD, YA, XD, XA, B and E. The function generator 122A comprises a memory 140, a gate 142 and an attenuator 144. In this embodiment of the function generator 122A, the terminals XD and YD are utilized for coupling the digital representations of the X and Y signals to the memory 140 while, in the previous embodiment of the function generator 122, the analog representation of the X and Y signals was utilized. The gate 142 of FIG. 7 is operated by an output signal of the memory 140 in a manner analogous to the operation of the gate 136 of FIG. 4 in response to a signal from the comparator 130.

By way of example, the memory 140 comprises two levels of a matrix each of which has the form of a square array of memory elements, there being 128 elements on a side of the square with the rows of the array being addressed by the digital number representing the Y signal and the columns of the array being addressed by the digital number representing the X signal. In the situation where the memory stores data with respect to an image of a radioactive thyroid gland such as that depicted in FIG. 8, the memory produces a one-bit signal on line 146 designating such values of X and Y signals which fall within the perimeter of the thyroid gland to operate the gate 142 to pass signals from terminal B via the attenuator 144 to terminal E.

Referring now to FIGS. 7 and 8, FIG. 8 shows a view of the face of the oscilloscope 58 of FIG. 1 portraying a diseased thyroid in which portions of the left lobe are less intense due to a failure of the diseased portion of the thyroid gland to absorb as much of a radiopharmaceutical as the healthy portions of the thyroid gland. Elements of the memory 140 corresponding to the diseased portion of the thyroid gland store both logic 1's and logic 0's so that the gate 142 is activated for only some of the X and Y addresses falling within the diseased portion while the gate 142 is activated for all addresses of X and Y falling within the healthy portion of the thyroid gland.

As a further feature of the function generator 122A, the second matrix level of the memory 140 provides logic 1's and 0's on line 148 to the attenuator 144 to attenuate the intensity of the E signal at locations of the simulated image which may emanate from portions of a subject which are further distant from the camera 24 of FIG. 1 than the points of the subject providing the maximum intensity of radiant energy. For example, the attenuator 144 may comprise a gain control circuit responsive to the magnitude of the voltage on line 148 to reduce the magnitude of signals from the gate 142 to a value of 80% of their initial value. It is apparent that, in view of the variation of amplitudes depicted in FIG. 3, the pulse height analyzer 50 of FIG. 1 will cause a reduction in the number of image points appearing on the face of the oscilloscope 58 of the signals which have been reduced in amplitude by the attenuator 144.

It is understood that the above-described embodiments of the invention are illustrative only and that modifications thereof may occur to those skilled in the art. Accordingly, it is desired that this invention is not to be limited to the embodiment disclosed herein but is to be limited only as defined by the appended claims.

What is claimed is:

1. A simulator of a radiographic camera providing signals representing the magnitude of radiant energy incident upon the camera and the location of the radiant energy relative to the camera, said simulator comprising:
   a frequency synthesizer for synthesizing the frequency of occurrence of radioactive events;
   an amplitude synthesizer for synthesizing the amplitudes of radioactive events;
   said frequency synthesizer being coupled to said amplitude synthesizer to provide a series of amplitude modulated pulses having a distribution of amplitudes according to the frequency of occurrence of such amplitudes for radiant energy emanating from a radioactive source, said modulated pulses having the form of said signals provided by said camera; and
   a location synthesizer coupled to said frequency synthesizer for providing location signals for said amplitude modulated pulses, said location signals having the form of the coordinate axes signals of said camera; said location synthesizer including means for modulating said location signals with the statistics of randomly occurring radioactive events.

2. A simulator according to claim 1 wherein said frequency synthesizer comprises a generator of a rectified sine wave and a generator of pulses, the repetition frequency of said pulse generator being variable, said pulse generator being coupled to an output of said rectified sine/wave generator for varying the pulse repetition frequency with a modulation pattern in the form of a rectified sine wave.

3. A simulator according to claim 2 wherein said amplitude synthesizer comprises a ramp generator and an amplitude modulator coupled thereto, said amplitude modulator being coupled to said pulse generator for modulating a train of said pulses with a ramp waveform modulation, said ramp waveform being provided by said ramp generator providing a ramp waveform to said amplitude modulator.

4. A simulator according to claim 3 wherein said ramp generator is synchronized to said generator of a rectified sine wave, the periodicity of a ramp waveform of said ramp generator being equal to the periodicity of the rectified sine wave of said generator of a rectified sine wave.

5. A simulator according to claim 1 wherein said location synthesizer comprises a random number generating means for generating two random numbers, one for each coordinate of the location of each of said radioactive events.

6. A simulator of a radiographic camera comprising:
   means for generating a train of pulses having the frequency distribution of a train of radioactive events as provided by a train of pulses of said camera; means coupled to said pulse train generator for modulating the amplitude of a train of said pulses with a monotonically increasing waveform;
   a gate coupled to said modulating means;
   means coupled to said pulse train generator for generating random numbers in response to occurrences of pulses of said pulse train; and
   means coupled between said gate and said random number generating means for operating said gate to pass pulses of said modulated pulse train when a first number of said random number generating means and a second number of said random number generating means are in accordance with a prescribed relationship, said gate operating means including means for providing said prescribed relationship, said first number and said second number of said random number generating means being location coordinates of a radioactive event.

7. A simulator according to claim 6 wherein said means for providing said prescribed relationship includes means for squaring said first and said second numbers of said random number generating means, means for forming the sum of said squares, means for providing a reference, and means for comparing said sum with said reference.

8. A simulator according to claim 6 wherein said means for providing said prescribed relationship comprises a memory addressed by said first and said second numbers of said random number generating means.

* * * * *